United States Patent
Geike

(10) Patent No.: US 12,074,555 B2
(45) Date of Patent: Aug. 27, 2024

(54) THERMAL MANAGEMENT OF POWER STAGES FOR PASSIVE MOTOR BRAKING

(71) Applicant: Infineon Technologies Austria AG, Villach (AT)

(72) Inventor: Hannes Mathias Geike, Munich (DE)

(73) Assignee: Infineon Technologies Austria AG, Villach (AT)

( * ) Notice: Subject to any disclaimer, the term of this patent is extended or adjusted under 35 U.S.C. 154(b) by 200 days.

(21) Appl. No.: 17/863,751

(22) Filed: Jul. 13, 2022

(65) Prior Publication Data
US 2024/0022188 A1 Jan. 18, 2024

(51) Int. Cl.
*H02P 6/12* (2006.01)
*H02P 6/24* (2006.01)

(52) U.S. Cl.
CPC . *H02P 6/24* (2013.01); *H02P 6/12* (2013.01)

(58) Field of Classification Search
CPC ..................................... H02P 6/12; H02P 6/24
See application file for complete search history.

(56) References Cited

U.S. PATENT DOCUMENTS

| | | | |
|---|---|---|---|
| 8,093,844 B2 * | 1/2012 | Milesi | H02P 6/24 318/362 |
| 2013/0221888 A1 * | 8/2013 | Horikoshi | H02P 3/22 318/400.29 |
| 2017/0163181 A1 * | 6/2017 | Namuduri | B60L 1/003 |

* cited by examiner

*Primary Examiner* — Rina I Duda
(74) *Attorney, Agent, or Firm* — Harrity & Harrity, LLP

(57) ABSTRACT

A method of passively braking a motor to reduce a current motor speed includes generating at least one control signal to control a first load current generated by a first half bridge circuit and a second load current generated by a second half bridge circuit. During passive braking, the method includes synchronously driving a first high-side transistor and a second high-side transistor between their respective switching states at an alternating shorting frequency such that they are simultaneously in a same switching state, and synchronously driving a first low-side transistor and a second low-side transistor between their respective switching states at the alternating shorting frequency such that they are simultaneously in a same switching state, wherein the first high-side transistor and the second high-side transistor are driven in a complementary manner to the first low-side transistor and the second low-side transistor according to a predetermined duty cycle.

22 Claims, 4 Drawing Sheets

THERMAL MANAGEMENT OF POWER STAGES FOR PASSIVE MOTOR BRAKING

BACKGROUND

Many functions of modern devices in automotive, consumer and industrial applications, such as driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

Usually, an inverter is composed by two complementary power switches (e.g., a high-side transistor and a low-side transistor) for each motor phase where the two complementary power transistors drive an output pad connected to a motor winding. A gate driver, used for driving the power switches, is supplied with a fixed positive voltage by a positive supply rail and a fixed negative voltage Vneg by a negative supply rail. The positive supply rail is connected to the output pad via the high-side switch to supply load current to the motor winding and the negative supply rail is connected to the output pad via the low-side switch to sink load current from the motor winding. The two complementary power switches are complementary turned ON and OFF to avoid cross-conduction.

The load current, also referred to as a motor phase current, may be controlled by means of a control electrode, sometimes referred to as gate electrode. For example, upon receiving a corresponding control signal from the gate driver, the control electrode may set its power switch in one of a conducting state and a blocking state. The gate-source voltage Vgs of a MOSFET is typically driven down to 0V to turn off the power switches and is typically driven to a maximum value for the technology (e.g., 3.3V) to fully turn on the power switches. For this reason, the gate-source voltage Vgs may be referred to as a control voltage.

During normal operation, a motor may be driven according to motor control algorithm to achieve a desired motor speed corresponding to an electrical frequency. However, situations arise when it is desired to brake the motor. This may include a controlled or emergency shutdown of the motor or, more generally, a slowdown of the motor. A motor is braked by generating a negative torque which slows the rotation of the motor. There currently exist active braking methods and passive braking methods used for motor braking. Active braking provides an active excitation (by applying a drive current) to a motor coil to generate a braking torque. In contrast, passive braking generates a negative torque by shorting a motor winding. Compared to active braking methods, in passive braking, the kinetic energy of the motor is purely converted into heat by the stator resistors of the motor (mainly) and the conduction losses of the power switches, instead of being fed back into the DC link.

A common approach for passive braking is to apply a zero-vector via low-side switches. The motor windings are shortened by the low-side switches. Due to the conduction losses that occur, the junction temperatures of the respective components in the low-side power switches increase. If the junction temperature of a power switch exceeds an upper limit, the power switch may fail.

Especially in compact technologies, such as MOSFETs or Reverse-Conducting IGBTs (transistor and freewheeling diode have almost same junction), thermal relaxation of the switches is hardly possible, which can easily lead to exceeding of the maximum junction temperature. Accordingly, an improved motor controller capable of managing the junction temperatures of the power switches of an inverter may be desirable.

SUMMARY

One or more embodiments provide a driver system configured to drive a motor, the driver system comprising: a first half bridge circuit comprising a first high-side transistor and a first low-side transistor, wherein the first high-side transistor and the first low-side transistor are configured to cooperatively generate a first load current for driving the motor, wherein the first load current has an AC electrical frequency that corresponds to a current motor speed of the motor; a second half bridge circuit comprising a second high-side transistor and a second low-side transistor, wherein the second high-side transistor and the second low-side transistor are configured to cooperatively generate a second load current for driving the motor, wherein the second load current has the AC electrical frequency that corresponds to the current motor speed of the motor; a gate driver circuit configured to receive at least one control signal and drive the first high-side transistor and the first low-side transistor between switching states to generate the first load current based on the at least one control signal and drive the second high-side transistor and the second low-side transistor between switching states to generate the second load current based on the at least one control signal; and a controller configured to generate the at least one control signal to control the first load current and the second load current, wherein the controller is configured to use passive braking to reduce the current motor speed of the motor. During passive braking, the gate driver circuit is configured to synchronously drive the first high-side transistor and the second high-side transistor between their respective switching states at an alternating shorting frequency such that they are simultaneously in a same switching state and synchronously drive the first low-side transistor and the second low-side transistor between their respective switching states at the alternating shorting frequency such that they are simultaneously in a same switching state, wherein, the first high-side transistor and the second high-side transistor are driven in a complementary manner to the first low-side transistor and the second low-side transistor according to a predetermined duty cycle.

A method of passively braking a motor to reduce a current motor speed of the motor, includes: generating at least one control signal to control a first load current generated by a first half bridge circuit and a second load current generated by a second half bridge circuit, wherein the first half bridge circuit comprising a first high-side transistor and a first low-side transistor, wherein the first high-side transistor and the first low-side transistor are configured to cooperatively generate the first load current for driving the motor, wherein the first load current has an AC electrical frequency that corresponds to a current motor speed of the motor, and wherein the second half bridge circuit comprising a second high-side transistor and a second low-side transistor, wherein the second high-side transistor and the second low-side transistor are configured to cooperatively generate the second load current for driving the motor, wherein the second load current has the AC electrical frequency that corresponds to the current motor speed of the motor; and during passive braking, synchronously driving the first high-side transistor and the second high-side transistor between their respective switching states at an alternating shorting frequency such that they are simultaneously in a same switching state, and synchronously driving the first low-side transistor and the second low-side transistor between their respective switching states at the alternating shorting frequency such that they are simultaneously in a same switching state, wherein the first high-side transistor and the second high-side transistor are driven in a complementary manner to the first low-side transistor and the second low-side transistor according to a predetermined duty cycle.

BRIEF DESCRIPTION OF THE DRAWINGS

Embodiments are described herein making reference to the appended drawings.

DETAILED DESCRIPTION

Figure 1:
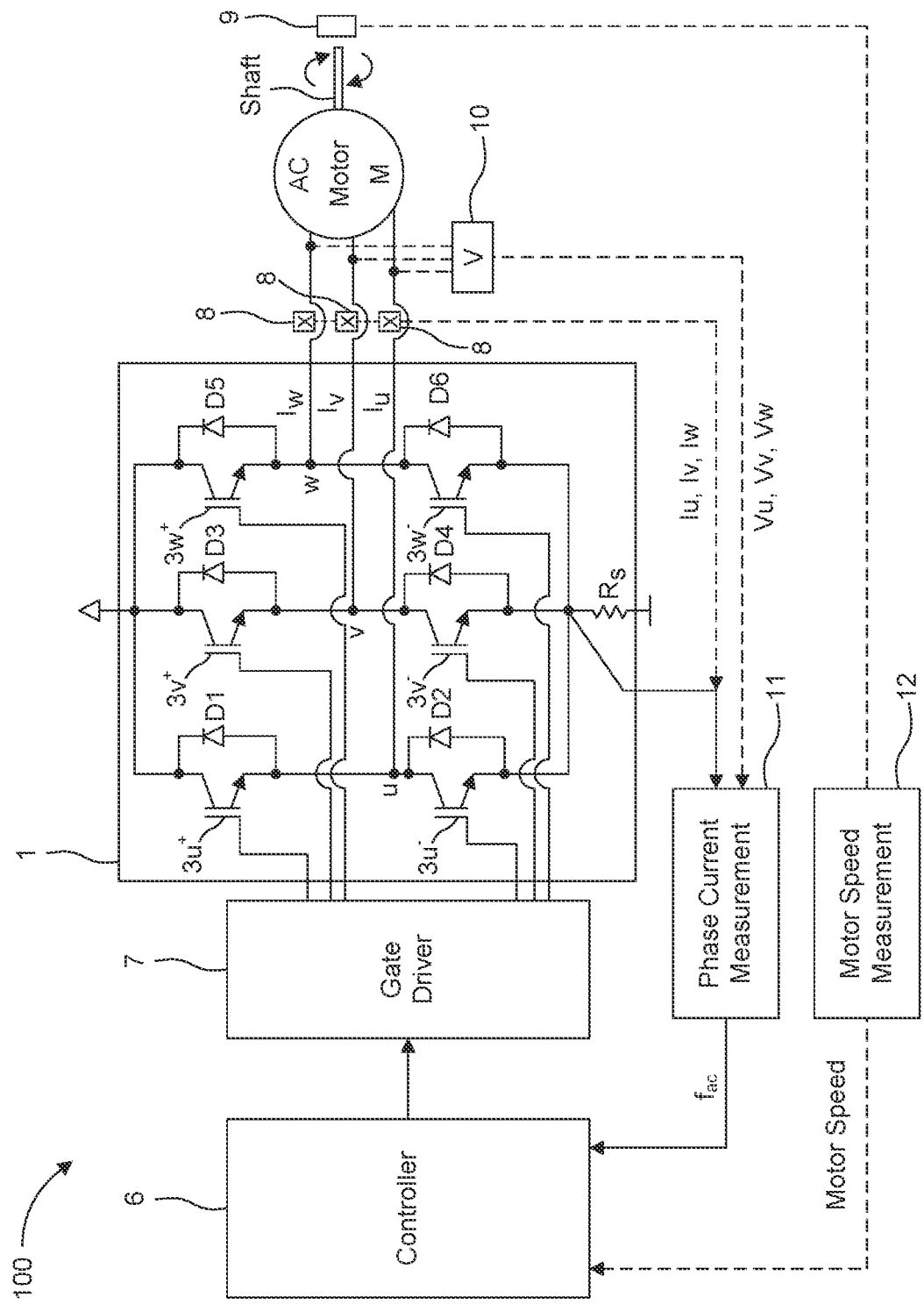
FIG. 1 is a schematic block diagram illustrating a motor control system 100 according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A sensor may refer to a component which converts a physical quantity to be measured to an electric signal, for example, a current signal or a voltage signal. The physical quantity may, for example, be a current or a voltage at a shunt resistor or a magnetic field produced by a current or by a rotating magnet.

One or more elements of the present disclosure may be configured by implementing dedicated hardware or a software program on a memory controlling a processor to perform the functions of any of the components or combinations thereof. Any of the processing components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry. Accordingly, the term "processor," as used herein refers to any of the foregoing structures or any other structure suitable for implementation of the techniques described herein.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (i.e., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

A power semiconductor device usually comprises a semiconductor structure configured to conduct a load current along a load current path between two load terminal structures or load electrodes (e.g., the source/emitter and the drain/collector) of the device. Further, the load current path may be controlled by means of a control electrode, sometimes referred to as gate electrode. For example, upon receiving a corresponding control signal from, e.g., a driver unit, the control electrode may set the power semiconductor device in one of a conducting state or a blocking state. A control signal may by a voltage signal or a current signal having a controlled value. Accordingly, the load current path of a transistor is a gate-controlled conductive channel whose conductivity is controlled by the gate voltage of the transistor.

A power transistor, also referred to as a power switch or a transistor switch, is a power semiconductor device that may be used to drive a load current. For example, a transistor can be turned "ON" or "OFF" by activating and deactivating its gate terminal. Applying a positive input voltage signal across the gate and the emitter will keep the device in its "ON" state, while making the input gate signal zero or slightly negative will cause it to turn "OFF". There is a turn-on process and a turn-off process for switching the power transistor on and off.

During the turn-on process of an n-channel transistor, a gate driver integrated circuit (IC) may be used to provide (source) a gate current (i.e., an ON current) to the gate of the power transistor in order to charge the gate to a sufficient voltage to turn on the device. In contrast, during the turn-off process of an n-channel transistor, the gate driver IC is used to draw (sink) a gate current (i.e., an off current) from the gate of the power transistor in order to discharge the gate voltage sufficiently to turn off the device. A voltage pulse may be output from the gate driver IC as the control signal according to a pulse width modulation (PWM) scheme. Thus, the control signal may be switched between an ON voltage level and an OFF voltage level during a PWM cycle for controlling the power transistor. This in turn charges and discharges the gate voltage to turn on and off the power transistor, respectively.

The opposite is true for a p-channel transistor. The gate driver IC may be used to draw (sink) a gate current (i.e., an ON current) from the gate of the power transistor in order to discharge the gate to a sufficient voltage to turn on the device. In contrast, during the turn-off process of a p-channel transistor, the gate driver IC is used to provide (source) a gate current (i.e., an off current) to the gate of the power transistor in order to charge the gate voltage sufficiently to turn off the device. The control signal may be switched between an ON voltage level and an OFF voltage level during a PWM cycle for controlling the power transistor. This in turn charges and discharges the gate voltage to turn on and off the power transistor, respectively.

For both n-channel and p-channel transistors, the transistor is off when the gate-source voltage Vgs is 0V or below a threshold voltage and the transistor is on when the gate-source voltage Vgs is equal to or greater than the threshold voltage.

For driving a load in this manner, two power transistors are typically arranged in a half-bridge configuration. The high-side (HS) power transistor may be a p-channel transistor connected to a high voltage bus or high supply potential and the low-side (LS) power transistor may be an n-channel resistor connected to a low voltage bus or low supply potential. In more complicated designs, the high-side power transistor and the low-side transistor may be of the same transistor type (e.g., both n-channel type). Both types of half-bridges are conceivable.

A load current is said to be a positive load current when it is flowing towards the load and a load current is said to be negative when it is flowing away from the load. A high-side power transistor, when on, is responsible for conducting a positive load current in order to source the load current to the load while its complementary power transistor is turned off (i.e., the low-side power transistor is in blocking or high impedance mode). In order to sink load current from the load, the roles of the two transistors are reversed. Here, the low-side power transistor, when on, is responsible for conducting a negative load current in order to sink the load current from the load while its complementary power transistor is turned off (i.e., the high-side power transistor is in blocking or high impedance mode). The two power transistors are typically switched such that both are not turned on at the same time.

Transistors may include Insulated Gate Bipolar Transistors (IGBTs) and Metal Oxide Semiconductor Field Effect Transistors (MOSFETs) (e.g., Si MOSFETs or SiC MOSFETs), but are not limited thereto. It will be appreciated that MOSFETs may be substituted for IGBTs and vice versa. In this context, when substituting a MOSFET for an IGBT, a MOSFET's drain may be substituted for an IGBT's collector, the MOSFET's source may be substituted for the IGBT's emitter, and the MOSFETs drain-source voltage VDS may be substituted for the IGBT's collector-emitter voltage VCE in any one of the examples described herein. Thus, any IGBT transistor or other transistor type may be substituted by a MOSFET transistor and vice versa.

Specific embodiments described in this specification pertain to, without being limited thereto, half-bridges used for driving electric motors. For example, a multi-phase inverter is configured to provide multi-phase power by supplying multiple phase loads (e.g., a three-phase motor). For instance, three-phase power involves three symmetrical sine waves that are 120 electrical degrees out of phase with one another. In a symmetric three-phase power supply system, three conductors each carry an alternating current (AC) of the same frequency and voltage amplitude relative to a common reference but with a phase difference of one third the period. Due to the phase difference, the voltage on any conductor reaches its peak at one third of a cycle after one of the other conductors and one third of a cycle before the remaining conductor. This phase delay gives constant power transfer to a balanced linear load. It also makes it possible to produce a rotating magnetic field in an electric motor.

In a three-phase system feeding a balanced and linear load, the sum of the instantaneous currents of the three conductors is zero. In other words, the current in each conductor is equal in magnitude to the sum of the currents in the other two, but with the opposite sign. The return path for the current in any phase conductor is the other two phase conductors. The instantaneous currents result in a current space vector.

A three-phase inverter includes three inverter legs, one for each of the three phases, and each inverter leg is connected to a direct current (DC) voltage source in parallel to each other. Each inverter leg includes a pair of transistors, for example, arranged in a half-bridge configuration for converting DC to AC. In other words, each inverter leg includes two complementary transistors (i.e., a high-side transistor and a low-side transistor) connected in series and which switch on and off complementary to each other for driving a phase load. However, multi-phase inverters are not limited to three phases, and may include two phases or more than three phases, with an inverter leg for each phase. In some instances, two half bridges may be connected as an H-bridge circuit with the load (e.g., the motor) connected as a crossbar between the two half bridges as a single-phase load.

FIG. 1 is a schematic block diagram illustrating a motor control system 100 according to one or more embodiments. In particular, the motor control system 100 includes a power inverter 1 and an inverter control unit that includes a controller 6 and a gate driver 7. The inverter control unit behaves as a motor control unit and thus may also be referred to as a motor controller or a motor control IC. The motor control unit may be a monolithic IC or may be split into a microcontroller and a gate driver on two or more ICs.

The motor control system 100 is further coupled to a three-phase motor M (e.g., a permanent magnet synchronous motor (PMSM) as a type of AC motor), that includes three phases U, V, and W. The power inverter 1 is a three-phase voltage generator configured to provide three-phase power by supplying three phase voltages to drive the motor M. It will be further appreciated that the power inverter 1 and the inverter control unit may be placed on a same circuit board, or on separate circuit boards.

Deviations in both magnitude and phase may cause a loss in power and torque in the motor M. Therefore, the motor control system 100 may be configured to monitor and control the magnitude and phase of the voltages supplied to the motor M in real-time to ensure the proper current balance is maintained based on a feedback control loop. Open loop motor control units also exist and may be implemented.

The power inverter 1 for a three-phase motor M includes a switching array of six power transistors 3u+, 3u−, 3v+, 3v−, 3w+, and 3w− (collectively referred to as transistors 3 or switches) arranged in complementary pairs. Each complementary pair forms a half-bridge circuit and constitutes one inverter leg that supplies a phase voltage to the three-phase motor M. Thus, each inverter leg includes an upper (high-side) transistor 3 and a lower (low-side) transistor 3. Additionally, each transistor 3 may be connected antiparallel to a corresponding freewheeling diode D1-D6. Load current paths U, V, and W extend from an output of each inverter leg (i.e., the output of each half-bridge circuit) located between complementary transistors and are configured to be coupled to a load, such as motor M. Each load current path U, V, and W carries a corresponding phase current Iu, Iv, and Iw. Each phase current Iu, Iv, and Iw has an AC electrical frequency that directly corresponds to the actual (current) motor speed of the motor M.

The power inverter 1 is coupled to a DC power supply 4 (e.g., a battery or a diode bridge rectifier) and to the gate driver 7 of the inverter control unit.

The controller 6 performs the motor control function of the motor control system 100 in real-time and transmits PWM control signals to a gate driver 7. The controller 6 may employ a PWM scheme for controlling the states of each transistor, and, ultimately, each phase current provided on the respective load current paths U, V, and W. The gate driver 7 generates driver signals based on the PWM control signals for controlling the switching states (i.e., on and off states) of the transistors 3. Thus, load current paths U, V, and W may be controlled by the controller 6 and the gate driver 7 by means of controlling the control electrodes (i.e., gate electrodes) of the transistors 3. For example, upon receiving a PWM control signal from the controller 6, the gate driver 7 may set a corresponding transistor in one of a conducting state (i.e., on-state) or a blocking state (i.e., off-state).

The gate driver 7 may be configured to receive instructions, including the power transistor control signals, from the controller 6, and turn on or turn off respective transistors 3 in accordance with the received instructions and control signals. For example, during the turn-on process of a respective transistor 3, the gate driver IC may be used to provide (source) a gate current to the gate of the respective transistor 3 in order to charge the gate. In contrast, during the turn-off process, the gate driver IC may be used to draw (sink) a gate current from the gate of the transistor 3 in order to discharge the gate.

Furthermore, the transistors 3 (i.e., transistors) of the power inverter 1 are controlled so that at no time are both transistors in the same inverter leg are turned on or else the DC supply would be shorted. This requirement may be met by the complementary operation of the switches 3 within an inverter leg according to the motor control algorithm. A dead time may be imposed by the controller during which both high-side and low-side transistors of a half-bridge are simultaneously turned off.

The motor control system 100 includes at least one means for measuring the electrical frequency of the motor M, which corresponds to the actual (current) motor speed of the motor. As noted above, the phase currents Iu, Iv, and Iw themselves have an AC electrical frequency that directly corresponds to the actual (current) motor speed of the motor M. Thus, the AC electrical frequency may be measured as one way to measure the current motor speed.

The AC electrical frequency can be measured by way of a shunt resistor Rs. For example, the power inverter 1 may include a shunt resistor Rs placed on the negative DC link (bus) of the power inverter 1. The transistors 3u+, 3u−, 3v+, 3v−, 3w+, and 3w− are represented as switches and the motor M has a winding for each of its phases (not illustrated). A phase current measurement circuit 11 may receive samples of the current taken from the shunt resistor Rs and then use an algorithm (i.e., software) to re-construct the three-phase current in real-time. For example, space vector pulse width modulation (SVPWM) is a vector control-based algorithm that requires the sensing of the three motor phase currents. SVPWM itself is an algorithm for the control of PWM in real-time. It is used for the creation of AC waveforms, and may be used to drive three-phase AC powered motors at varying speeds from a DC source using multiple switching transistors. While the examples herein are described in the context of three-phase motors, the examples are not limited thereto and may be applied to any load scheme.

By using the single-shunt resistor Rs, DC-link current pulses are sampled at exactly timed intervals. A voltage drop on the shunt resistor Rs may be amplified by an operational amplifier of the phase current measurement circuit 11 and shifted up, for example, by 1.65V. The resultant voltage may be converted by an ADC of the phase current measurement circuit 11. Based on the actual combination of switches, the three-phase currents of the motor M are reconstructed using the SVPWM algorithm. The ADC may measure the DC-link current during the active vectors of the PWM cycle. In each PWM cycle, there are two different active vectors and the DC link current in each active vector represents current on one motor phase. Thus, there are two phase current measurements are available in each PWM cycle. The calculation of the third phase current value is possible because the three winding currents sum to zero. Accordingly, the phase current measurement circuit 11 may include a phase current reconstruction circuit that uses single shunt reconstruction to reconstruct each of the phase currents Iu, Iv, and Iw for each respective phase U, V, and W. In any case, the phase current measurement circuit 11 may measure an AC electrical frequency fac of one of the phase currents Iu, Iv, or Iw and provide the measured AC electrical frequency fac to the controller 6, which may then control the switching states of transistors 3 based on the measured AC electrical frequency. For example, the controller 6 may control an alternating shorting frequency of the transistors 3 during passive braking of the motor M based on the measured AC electrical frequency.

It will be appreciated that other implementations other than a single-shunt resistor may be used for current sensing, as well as other motor control algorithms may be used to control the load, and that the embodiments described herein are not limited thereto. For example, a current sensor 8 placed along one of the load current paths U, V, and W may be used for current sensing instead of a shunt resistor Rs placed on the negative DC link (bus) of the power inverter 1. For example, a current sensor, such as a Hall sensor 8 or shunt resistor, could be placed along at least one of the load current paths U, V, and W and at least one of the phase currents could be measured directly therefrom by the phase current measurement circuit 11 in order to measure the AC electrical frequency fac of a phase current. Alternatively, the output voltage of a corresponding half-bridge circuit could be measured, which oscillates at the AC electrical frequency of a corresponding phase current. For example, voltage sensor 10 may be configured to measure one or more line voltages Vu, Vv, or Vw corresponding to respective load currents for measuring the AC electrical frequency. Since all phase currents have the same AC electrical frequency, only one phase current or line voltage needs to be measured for determining the AC electrical frequency. The measured AC electrical frequency is directly correlated to the current motor speed of the motor M and is thus representative of the current motor speed.

Alternatively, a speed sensor 9 may be used to directly measure the rotational speed (motor speed) of the motor M, which is proportional to the AC electrical frequency used to drive the motor (i.e., the frequency of the phase currents). For example, a magnet may be fixed to an end of a rotating shaft that is driven by the motor M. A magnetic sensor arranged proximate to the magnet may be implemented in a speed sensor to measure a strength and/or orientation of the magnetic field that changes at a frequency proportional to the motor speed. Thus, the motor speed or the electrical frequency of the motor M may be derived from electrical signals generated by the magnetic sensor by a motor speed measurement circuit 12. In particular, the motor speed measurement circuit 12 may include a processor that is configured to receive a sensor signal from the speed sensor 9 and determine the motor speed from the sensor signal. The motor speed measurement circuit 12 provides the current motor speed to the controller 6, which may then control the switching states of transistors 3 based on the measured (current) motor speed. For example, the controller 6 may control an alternating shorting frequency of the transistors 3 during passive braking of the motor M based on the measured (current) motor speed.

Thermal management of the transistors 3 during passive braking of the motor is important for maintaining the integrity of the power inverter 1. The controller 6 is configured to generate the at least one control signal to control the load currents (i.e., phase currents) that are generated by half-bridges of the power inverter 1. This includes controlling the switching states of the transistors 3 for implementing passive braking to reduce the current motor speed of the motor.

To implement passive braking, for example, in a SVPWM control scheme, the controller 6 applies a zero vector condition to the current vector. To modulate the amplitude of the current vector, the zero vector (000) or (111) is applied by the controller 6. This means, that the motor phases are shorted. This causes the current in the stator to decay. Once the stator current has decayed, a current is permitted to flow that will oppose the rotational force causing braking. As the changing magnetic field of the rotor-stator interaction induces a voltage which is now shorted out via the power inverter 1.

In order to decrease the total braking time and prevent overheating of the transistors 3, the controller 6 is configured to provide cooling time for all the transistors 3 during passive braking. This is achieved by alternatively shorting the motor winding via the low-side transistors, as well as by alternatively shorting the high-side transistors. Thus, the thermal load is shared by the complementary switches respectively. Based on this approach, the thermal situation of the power stage can be managed. This way, the thermal load is better distributed among the transistors, which can reduce the maximum occurring junction temperature significantly. This approach makes it possible to realize more compact power stages, which would not be possible without this approach.

In particular, during passive braking, all high-side transistors are synchronously turned on and off at an alternating shorting frequency falt such that they are simultaneously in a same switching state (i.e., all are simultaneously on or all are simultaneously off). Likewise, during passive braking, all low-side transistors are synchronously turned on and off at an alternating shorting frequency falt such that they are simultaneously in a same switching state (i.e., all are simultaneously on or all are simultaneously off). In addition, the high-side transistors are driven in a complementary manner to the high-side transistors according to a predetermined duty cycle. That is, while the high-side transistors are switched on, the low-side transistors are switched off, and vice versa.

Accordingly, during passive braking, the gate driver 7 is configured to drive high-side transistor 3u+ and low-side transistor 3u− in a complementary manner between their respective switching states at the alternating shorting frequency falt with the predetermined duty cycle to reduce the current motor speed of the motor, the gate driver 7 is configured to drive high-side transistor 3v+ and low-side transistor 3v− in a complementary manner between their respective switching states at the alternating shorting frequency falt with the predetermined duty cycle to reduce the current motor speed of the motor, and the gate driver 7 is configured to drive high-side transistor 3w+ and low-side transistor 3w− in a complementary manner between their respective switching states at the alternating shorting frequency falt with the predetermined duty cycle to reduce the current motor speed of the motor, with the additional conditions that the high-side transistors 3u+, 3v+, and 3w+ are driven synchronously between their respective switching states at the alternating shorting frequency falt such that they are all on simultaneously or all off simultaneously, and the low-side transistors 3u–, 3v–, and 3w– are driven synchronously between their respective switching states at the alternating shorting frequency falt such that they are all on simultaneously or all off simultaneously.

In addition, the gate driver 7 is configured to drive the high-side transistors and the low-side transistors in alternating switching intervals during passive braking, including a first switching interval that alternates with a second switching interval that alternate according to the alternating shorting frequency falt, to reduce the current motor speed of the motor. During the first switching interval, the high-side transistors are in an ON state and the low-side transistors are in an OFF state. During the second switching interval, the low-side transistors are in an ON state and the high-side transistors are in an OFF state. A duration of the first switching interval and a duration of the second switching interval define the predetermined duty ratio.

In some cases, the predetermined duty ratio is 50% such that the duration of the first switching interval is equal to the duration of the second switching interval. This may be the case when the junction temperatures of all transistors 3 (the high-side transistors and the low-side transistors) rise and/or decay at substantially equal rates when turned off. The result is that a thermal load is distributed substantially equally (i.e., balanced) between all transistors 3 such that their respective junction temperatures are substantially equal during their respective turn-on intervals. In other words, the junction temperatures of the transistors 3 rise and decay in a similar pattern throughout a PWM period or cycle, or vary substantially between the same lower junction temperature and the same higher junction temperature.

In contrast, in some cases, the predetermined duty ratio different than 50% such that the duration of the first switching interval is different than the duration of the second switching interval. This may be the case when the junction temperatures of the high-side transistors rise and/or decay at different rates compared to the junction temperatures of the low-side transistors. For example, the high-side transistors may have better cooling capabilities than the low-side transistors, or vice versa. For example, the high-side transistors may be arranged on a heat sink, whereas the low-side transistors may not be arranged on a heat sink, or vice versa. Thus, the transistors with better cooling capabilities (e.g., those arranged on a heat sink) require less time to cool when compared to those transistors with less favorable cooling capabilities. Those transistors with better cooling capabilities may be turned on for a longer duration within a PWM period and those transistors with less favorable cooling capabilities may be turned off for a longer duration within a PWM period in order to balance the thermal load amongst all transistors 3.

For example, the predetermined duty ratio may be set between 35% and 50% or between 50% and 65% such that either the duration of the first switching interval is greater than the duration of the second switching interval or the duration of the second switching interval is greater than the duration of the first switching interval, respectively, depending on the cooling capabilities of the high-side transistors in comparison with the cooling capabilities of the low-side transistors.

Thus, the predetermined duty ratio is set such that the junction temperatures of all transistors 3 remain confined within a defined temperature range (e.g., between a lower temperature threshold and a higher temperature threshold) and more specifically may be set such that the junction temperatures of all transistors 3 vary substantially between the same lower junction temperature and the same higher junction temperature during passive braking. In this way, thermal management is employed the through equal distribution of power losses to all six power transistors.

It is worthwhile noting that the controller 6 may in the alternative operate the motor in running mode, during which the motor is being actively driven instead of being passively braked. For example, the controller 6 may control the gate driver 7 to drive the transistors 3 between their respective switching states to maintain the motor at a target motor speed. During running mode, only one high-side transistor and only one low-side transistor is turned on at any given time, and transistors in the same half-bridge (inverter leg) are never turned on simultaneously. Thus, the high-side transistors are driven between their respective switching states such that none are turned on simultaneously. Likewise, the low-side transistors are driven between their respective switching states such that none are turned on simultaneously. Additionally, dead time may be imposed by the controller 6 during which both high-side and low-side transistors of a half-bridge are simultaneously turned off for a short duration.

Figure 2:
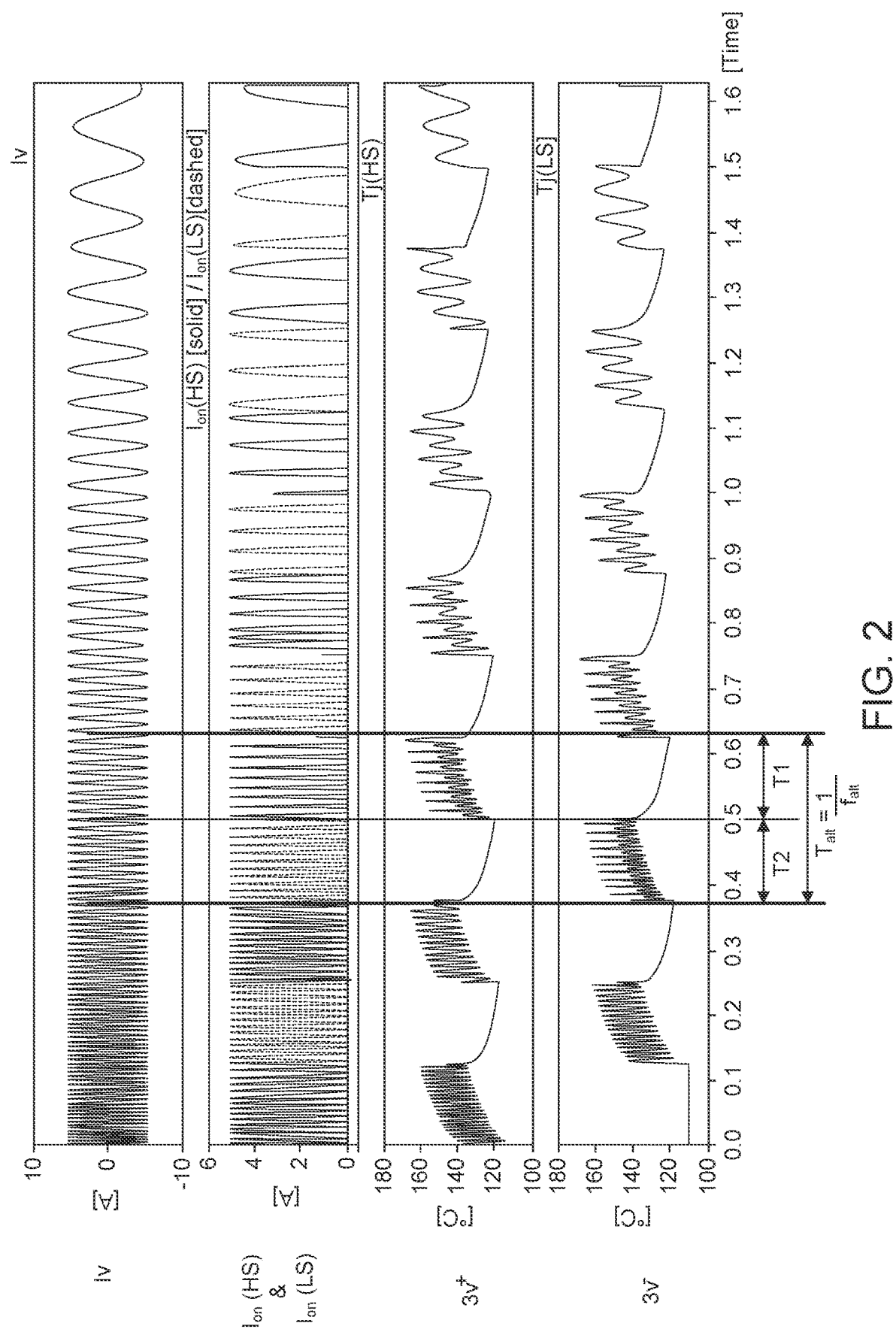
FIG. 2 illustrates various current waveforms and junction temperature waveforms during passive braking according to one or more embodiments.

FIG. 2 illustrates various current waveforms and junction temperature waveforms over time during passive braking according to one or more embodiments. The top waveform in FIG. 2 illustrates a phase current Iv during passive braking during which the motor speed is reduced. The phase current Iv oscillates at an AC electrical frequency that corresponds to the current motor speed of the motor. Thus, as the motor speed is reduced, so does the AC electrical frequency of the phase current Iv.

The next waveform in FIG. 2 illustrates the on current through the high-side transistor 3v+ (represented by a solid line) and the on current through the low-side transistor 3v– (represented by a dashed line) during alternating switching intervals. Together, the two on currents combine to form the phase current Iv. Thus, the two on currents also oscillate at the AC electrical frequency that corresponds to the current motor speed of the motor. The alternating switching intervals include a first switching interval T1 and second switching interval T2, the sum of which forms one period Talt. During the first switching interval T1, the high-side transistor 3v+ is in an ON state and the low-side transistor 3v– is in an OFF state. During the first switching interval T1, the flow of the on current (HS) oscillates between a forward conduction path of the gate-controlled channel of the transistor 3v+ and its freewheeling diode D3. During the second switching interval T2, the low-side transistor 3v– is in an ON state and the high-side transistor 3v+ is in an OFF state. During the second switching interval T2, the flow of the on current (LS) oscillates between a forward conduction path of the gate-controlled channel of the transistor 3v– and its freewheeling diode D4. Both the high-side transistor 3v+ and the low-side transistor 3v– are switched between their respective switching states at an alternating shorting frequency falt, defined by period Talt. Additionally, the durations of the two switching intervals T1 and T2 are equal. Thus, the duty ratio is set to 50% in this example.

The bottom two waveforms in FIG. 2 illustrate junction temperatures Tj of the high-side transistor 3v+ and the low-side transistor 3v–, respectively. It can be seen that during the first switching interval T1, during which the high-side transistor 3v+ is on and the low-side transistor 3v– is off, that the junction temperature of the high-side transistor 3v+ increases over the length of the interval with some ripple to a maximum value as the on current alternatively flows through gate-controlled channel of the transistor 3v+ and its freewheeling diode D3. Meanwhile, the junction temperature of the low-side transistor 3v− steadily increases to a minimum value while the low-side transistor 3v− is turned off. It can also be seen that during the second switching interval T2, during which the low-side transistor 3v− is on and the high-side transistor 3v+ is off, that the junction temperature of the low-side transistor 3v− increases over the length of the interval with some ripple to a maximum value as the on current alternatively flows through gate-controlled channel of the transistor 3v− and its freewheeling diode D4. Meanwhile, the junction temperature of the high-side transistor 3v+ steadily increases to a minimum value while the high-side transistor 3v+ is turned off. The thermal load between transistors 3v+ and 3v− is substantially balanced throughout the passive braking operation. For example, the junction temperatures of the transistors 3v+ and 3v− fluctuate between substantially the same minimum and maximum temperature values during passive braking.

Figure 3:
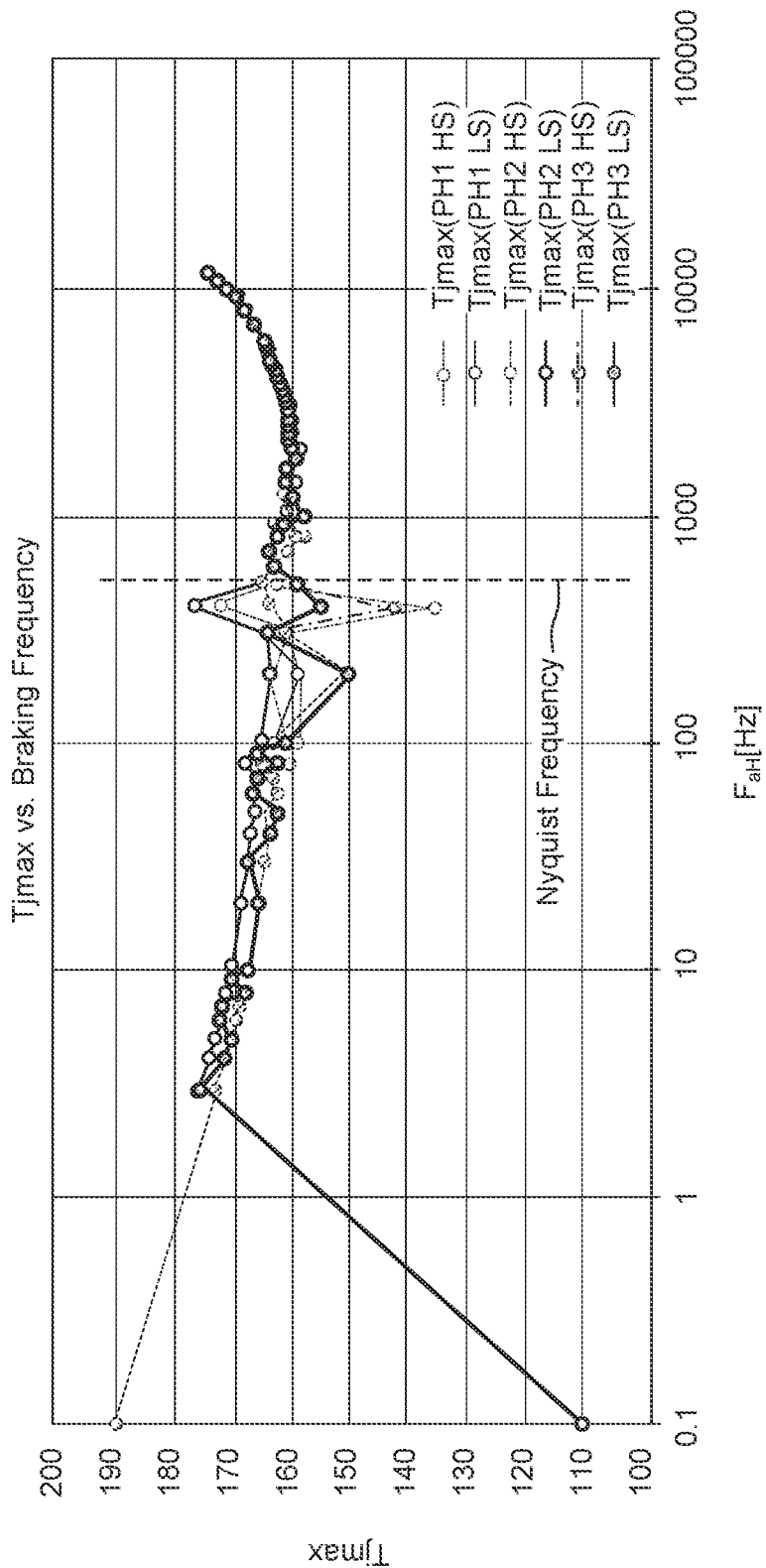
FIG. 3 is a graph of the maximum junction temperature Tjmax of the six power transistors 3 versus the braking frequency (i.e., alternating shorting frequency falt) according to one or more embodiments.

FIG. 3 is a graph of the maximum junction temperature Tjmax of the six power transistors 3 versus the braking frequency (i.e., alternating shorting frequency falt) according to one or more embodiments. The maximum junction temperatures Tjmax correspond to different phase currents (PH1 HS, PH1 LS, PH2 HS, PH2 LS, PH3 HS, and PH3 LS) that flow through a perspective transistor. In this example, it is assumed that the AC electrical frequency fac is 100 Hz and that the Nyquist frequency is 400 Hz (i.e., four times the AC electrical frequency). The Nyquist frequency is an N multiple the AC electrical frequency, where N is in integer, below which distortion (aliasing) occurs. Said differently, Nyquist frequency is an N multiple the AC electrical frequency, where N is in integer of two or greater, at or above which there is little to no distortion (i.e., free of aliasing). In this example, N is four. The Nyquist frequency may also be referred to as the aliasing frequency.

It can be seen from FIG. 3 that for alternating shorting frequencies falt less than 400 Hz (i.e., less than the Nyquist frequency of the motor), that there are large fluctuations in junction temperature among the transistors 3u+, 3u−, 3v+, 3v−, 3w+, and 3w−, with the largest fluctuations occurring at frequencies just below the Nyquist frequency. These fluctuations are indicative of uneven distributions of the thermal load between the transistors 3u+, 3u−, 3v+, 3v−, 3w+, and 3w−, which would lead to the junction temperatures of the transistors fluctuate between substantially different minimum and maximum temperature values during passive braking. In order to ensure even distributions of the thermal load between the transistors 3u+, 3u−, 3v+, 3v−, 3w+, and 3w−, it has been determined that the alternating shorting frequency falt should be set to be equal to or greater than a Nyquist frequency of the motor. In this case, the Nyquist frequency is four times the AC electrical frequency and the alternating shorting frequency falt should be set to at least four times the AC electrical frequency. It can also be observed that the maximum junction temperatures begin to increase with increasing alternating shorting frequency falt above the Nyquist frequency and that, at some point, the maximum junction temperature will increase above an overtemperature threshold that can damage the transistors 3. This is a result of shorter resting periods for each transistor as frequency increases. Thus, junction temperature can build up. Exceeding this overtemperature threshold should be avoided. For example, the alternating shorting frequency may be limited to be equal to or less than 100 times the AC electrical frequency in order to prevent the maximum junction temperature of the transistors from exceeding the overtemperature threshold.

Turning back to FIG. 1, the motor control system 100 includes a measurement circuit configured to measure an operating parameter corresponding to the AC electrical frequency, where the controller 6 is configured to set the alternating shorting frequency falt based on the measured operating parameter such that the alternating shorting frequency falt is equal to or greater than the Nyquist frequency of the motor. The operating parameter may be the AC electrical frequency and the measurement circuit comprises a current sensor configured to measure one of the load currents for measuring the AC electrical frequency. Alternatively, the operating parameter may be the AC electrical frequency and the measurement circuit comprises a voltage sensor configured to measure a line voltage corresponding to a load current for measuring the AC electrical frequency. Alternatively, the operating parameter may be the current motor speed of the motor and the measurement circuit comprises a speed sensor configured to measure the current motor speed of the motor.

The measurement circuit may include the phase current measurement circuit 11 which measures the AC electrical frequency fac as the operating parameter in the manner previously described above. Thus, the phase current measurement circuit 11 provides the AC electrical frequency fac to the controller 6 as the operating parameter and the controller 6 sets the alternating shorting frequency falt based on the AC electrical frequency fac.

Alternatively, the measurement circuit may include the motor speed measurement circuit 12 which measures the motor speed as the operating parameter in the manner previously described above. Thus, the motor speed measurement circuit 12 provides the motor speed to the controller 6 as the operating parameter and the controller 6 sets the alternating shorting frequency falt based on the measured motor speed (e.g., to be four times or greater than electrical frequency of the motor derived from the motor speed).

The controller 6 may be configured to set the alternating shorting frequency falt to be equal to or greater than a Nyquist frequency of the motor at the time passive braking is initiated. In other words, the controller 6 samples the operating parameter (e.g., the AC electrical frequency fac or the motor speed) at the time it initiates passive braking and sets the alternating shorting frequency falt accordingly at that time. The alternating shorting frequency falt may be fixed during the entire passive braking operation according to this initial frequency setting.

Alternatively, the alternating shorting frequency falt may be variable during passive braking and the controller 6 is configured to adjust the alternating shorting frequency falt as the current motor speed changes during passive braking. For example, since the AC electrical frequency fac is directly related to the motor speed, as the motor speed decreases, so does the AC electrical frequency fac and, along with it the Nyquist frequency. That is, as the motor speed decreases, the Nyquist frequency also decreases. The frequency at which the overtemperature threshold occurs can also decrease with reduced motor speed. Thus, in order to maintain the junction temperatures within a desired temperature range with event thermal load distribution among transistors 3, the controller 6 may be configured to reduce the alternating shorting frequency falt as the motor speed decreases based on the measured operating parameter while still ensuring that the alternating shorting frequency falt is maintained to be equal or greater than the changing Nyquist frequency.

When the alternating shorting frequency falt is variable, the controller 6 may be configured to set the alternating shorting frequency falt to a predetermined multiple of the AC electrical frequency based on the measured operating parameter. The predetermined multiple may be four or greater as discussed above, but may be equal to or less than 100 times the AC electrical frequency. During passive braking, the measurement circuit 11 or 12 is configured to measure the operating parameter continuously or at regular predetermined intervals, and the controller 6 is configured to adjust the alternating shorting frequency falt such that the alternating shorting frequency falt is maintained at the predetermined multiple of the AC electrical frequency as the current motor speed is reduced. Thus, the alternating shorting frequency falt is variable during passive braking and the controller 6 is configured to adjust the alternating shorting frequency falt as the current motor speed changes during passive braking.

Figure 4:
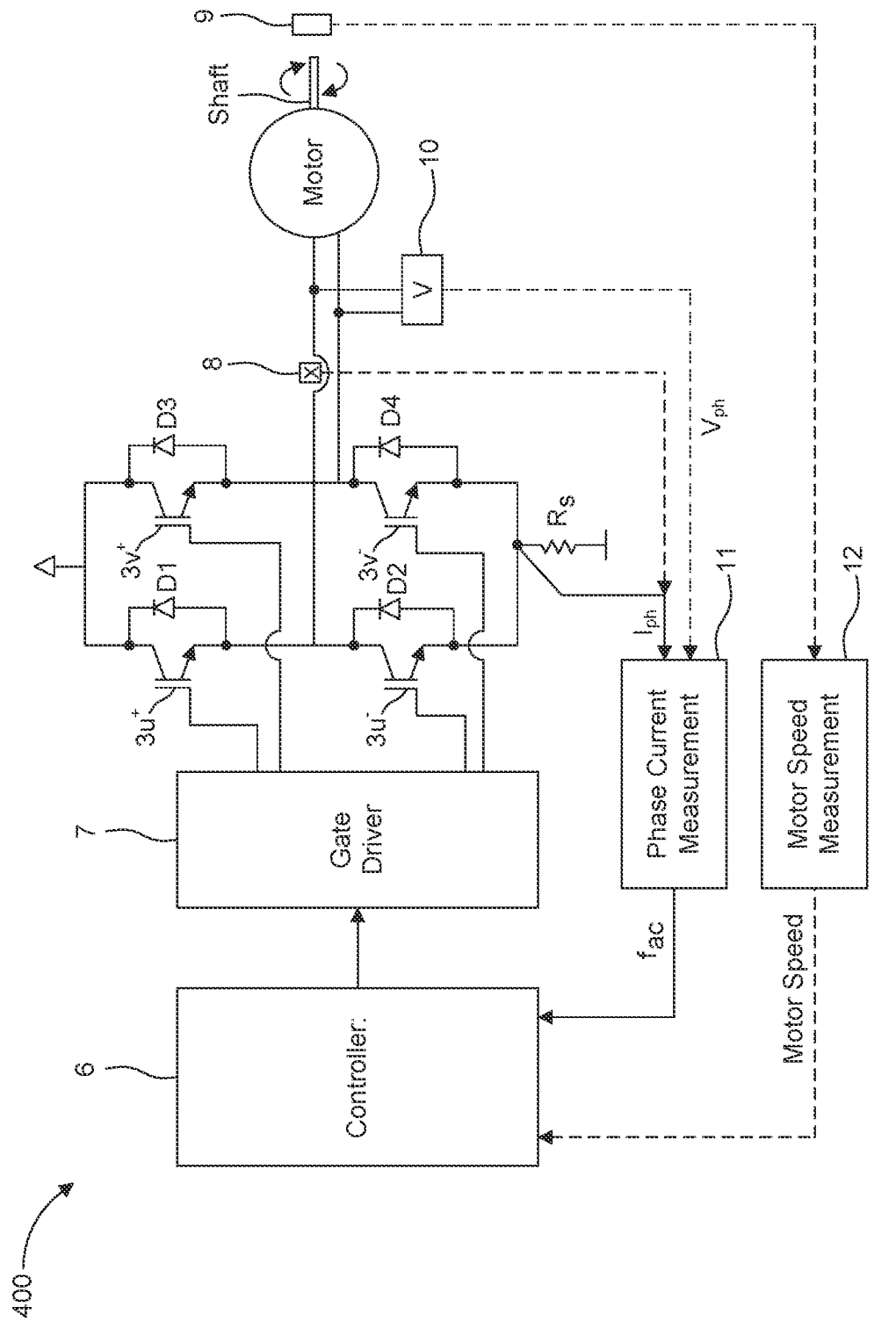
FIG. 4 is a schematic block diagram illustrating a motor control system according to one or more embodiments.

While the above-described embodiments related to a three-phase inverter circuit comprising the three half bridge circuits, other configurations that use two or more half-bridges are possible. FIG. 4 is a schematic block diagram illustrating a motor control system 400 according to one or more embodiments. The motor control system 400 includes two half-bridge circuits arranged in a H-bridge configuration for driving a motor. Accordingly, a first half-bridge circuit incudes high-side transistor 3u+ and low-side transistor 3u− and a second half-bridge circuit includes high-side transistor 3v+ and low-side transistor 3v−. The phase current measurement circuit 11 may measure a phase (load) current Iph or phase (line) voltage Vph to determine the AC electrical frequency fac or the motor speed measurement circuit 12 may be used for measuring the motor speed in a similar manner described above.

During passive braking, the gate driver 7 is configured to synchronously drive the high-side transistors between their respective switching states at an alternating shorting frequency such that they are simultaneously in a same switching state and synchronously drive the low-side transistors between their respective switching states at the alternating shorting frequency such that they are simultaneously in a same switching state, where, the high-side transistors are driven in a complementary manner to the low-side transistors according to a predetermined duty cycle. Accordingly, the same principle described above for passive braking can be applied to the H-bridge circuit.

Additional embodiments are provided below.

Embodiment 1: A driver system configured to drive a motor, the driver system comprising: a first half bridge circuit comprising a first high-side transistor and a first low-side transistor, wherein the first high-side transistor and the first low-side transistor are configured to cooperatively generate a first load current for driving the motor, wherein the first load current has an AC electrical frequency that corresponds to a current motor speed of the motor; a second half bridge circuit comprising a second high-side transistor and a second low-side transistor, wherein the second high-side transistor and the second low-side transistor are configured to cooperatively generate a second load current for driving the motor, wherein the second load current has the AC electrical frequency that corresponds to the current motor speed of the motor; a gate driver circuit configured to receive at least one control signal and drive the first high-side transistor and the first low-side transistor between switching states to generate the first load current based on the at least one control signal and drive the second high-side transistor and the second low-side transistor between switching states to generate the second load current based on the at least one control signal; and a controller configured to generate the at least one control signal to control the first load current and the second load current, wherein the controller is configured to use passive braking to reduce the current motor speed of the motor, wherein, during passive braking, the gate driver circuit is configured to drive the first high-side transistor and the first low-side transistor in a complementary manner between their respective switching states at an alternating shorting frequency with a predetermined duty cycle, wherein, during passive braking, the gate driver circuit is configured to drive the second high-side transistor and the second low-side transistor in a complementary manner between their respective switching states at the alternating shorting frequency with the predetermined duty cycle, wherein, during passive braking, the first high-side transistor and the second high-side transistor are driven synchronously between their respective switching states at the alternating shorting frequency such that they are both on simultaneously or both off simultaneously, and wherein, during passive braking, the first low-side transistor and the second low-side transistor are driven synchronously between their respective switching states at the alternating shorting frequency such that they are both on simultaneously or both off simultaneously.

Embodiment 2: The driver system of embodiment 1, wherein the AC electrical frequency is directly correlated to the current motor speed of the motor.

Embodiment 3: The driver system of embodiment 1, wherein, during running mode, the gate driver circuit is configured to drive the first high-side transistor, the second high-side transistor, the first low-side transistor, and the second high-side transistor between their respective switching states to maintain the motor at a target motor speed.

Embodiment 4: The driver system of embodiment 3, wherein, during running mode: the first high-side transistor and the second high-side transistor are driven between their respective switching states such that they are not on simultaneously, and the first low-side transistor and the second low-side transistor are driven between their respective switching states such that they are not on simultaneously.

While various embodiments have been disclosed, it will be apparent to those skilled in the art that various changes and modifications can be made which will achieve some of the advantages of the concepts disclosed herein without departing from the spirit and scope of the invention. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims
    other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent on the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof, including any combination of a computing system, an integrated circuit, and a computer program on a non-transitory computer-readable recording medium. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments, a single act may include or may be broken into multiple sub acts. Such sub acts may be included and part of the disclosure of this single act unless explicitly excluded.

What is claimed is:

1. A driver system configured to drive a motor, the driver system comprising:
   a first half bridge circuit comprising a first high-side transistor and a first low-side transistor, wherein the first high-side transistor and the first low-side transistor are configured to cooperatively generate a first load current for driving the motor, wherein the first load current has an AC electrical frequency that corresponds to a current motor speed of the motor;
   a second half bridge circuit comprising a second high-side transistor and a second low-side transistor, wherein the second high-side transistor and the second low-side transistor are configured to cooperatively generate a second load current for driving the motor, wherein the second load current has the AC electrical frequency that corresponds to the current motor speed of the motor;
   a gate driver circuit configured to receive at least one control signal and drive the first high-side transistor and the first low-side transistor between switching states to generate the first load current based on the at least one control signal and drive the second high-side transistor and the second low-side transistor between switching states to generate the second load current based on the at least one control signal; and
   a controller configured to generate the at least one control signal to control the first load current and the second load current, wherein the controller is configured to use passive braking to reduce the current motor speed of the motor,
   wherein, during passive braking, the gate driver circuit is configured to synchronously drive the first high-side transistor and the second high-side transistor between their respective switching states at an alternating shorting frequency such that they are simultaneously in a same switching state and synchronously drive the first low-side transistor and the second low-side transistor between their respective switching states at the alternating shorting frequency such that they are simultaneously in a same switching state, wherein, the first high-side transistor and the second high-side transistor are driven in a complementary manner to the first low-side transistor and the second low-side transistor according to a predetermined duty cycle.

2. The driver system of claim 1, wherein, during passive braking:
   the gate driver circuit is configured to drive the first high-side transistor and the first low-side transistor in a complementary manner between their respective switching states at the alternating shorting frequency with the predetermined duty cycle to reduce the current motor speed of the motor,
   the gate driver circuit is configured to drive the second high-side transistor and the second low-side transistor in a complementary manner between their respective switching states at the alternating shorting frequency with the predetermined duty cycle to reduce the current motor speed of the motor,
   the first high-side transistor and the second high-side transistor are driven synchronously between their respective switching states at the alternating shorting frequency such that they are both on simultaneously or both off simultaneously, and
   the first low-side transistor and the second low-side transistor are driven synchronously between their respective switching states at the alternating shorting frequency such that they are both on simultaneously or both off simultaneously.

3. The driver system of claim 1, wherein, during passive braking:
   the gate driver circuit is configured to drive the first high-side transistor, the first low-side transistor, the second high-side transistor, and the second low-side transistor in alternating switching intervals, including a first switching interval that alternates with a second switching interval that alternate according to the alternating shorting frequency, to reduce the current motor speed of the motor,
   wherein, during the first switching interval, the first high-side transistor and the second high-side transistor are in an ON state and the first low-side transistor and the second low-side transistor are in an OFF state, and
   wherein, during the second switching interval, the first low-side transistor and the second low-side transistor are in an ON state and the first high-side transistor and the second high-side transistor are in an OFF state,
   wherein a duration of the first switching interval and a duration of the second switching interval define a predetermined duty ratio.

4. The driver system of claim 3, wherein the predetermined duty ratio is 50% such that the duration of the first switching interval is equal to the duration of the second switching interval.

5. The driver system of claim 3, wherein the predetermined duty ratio is between 35% and 50% or between 50% and 65% such that either the duration of the first switching interval is greater than the duration of the second switching interval or the duration of the second switching interval is greater than the duration of the first switching interval, respectively.

6. The driver system of claim 1, further comprising:
   an H-bridge circuit comprising the first half bridge circuit and the second half bridge circuit.

7. The driver system of claim 1, further comprising:
   a three-phase inverter circuit comprising the first half bridge circuit and the second half bridge circuit.

8. The driver system of claim 1, wherein the alternating shorting frequency is equal to or greater than a Nyquist frequency of the motor.

9. The driver system of claim 8, wherein the Nyquist frequency is four times the AC electrical frequency.

10. The driver system of claim 9, wherein the alternating shorting frequency is equal to or less than 100 times the AC electrical frequency.

11. The driver system of claim 8, further comprising:
a measurement circuit configured to measure an operating parameter corresponding to the AC electrical frequency,
wherein the controller is configured to set the alternating shorting frequency based on the measured operating parameter such that the alternating shorting frequency is equal to or greater than the Nyquist frequency of the motor.

12. The driver system of claim 11, wherein:
the controller is configured to set the alternating shorting frequency to a predetermined multiple of the AC electrical frequency based on the measured operating parameter,
during passive braking, the measurement circuit is configured to measure the operating parameter continuously or at regular predetermined intervals, and the controller is configured to adjust the alternating shorting frequency such that the alternating shorting frequency is maintained at the predetermined multiple of the AC electrical frequency as the current motor speed is reduced.

13. The driver system of claim 12, wherein the predetermined multiple is equal to or greater than four.

14. The driver system of claim 11, wherein the operating parameter is the AC electrical frequency and the measurement circuit comprises a current sensor configured to measure the first load current for measuring the AC electrical frequency.

15. The driver system of claim 11, wherein the operating parameter is the AC electrical frequency and the measurement circuit comprises a voltage sensor configured to measure a line voltage corresponding to the first load current for measuring the AC electrical frequency.

16. The driver system of claim 11, wherein the operating parameter is the current motor speed of the motor and the measurement circuit comprises a speed sensor configured to measure the current motor speed of the motor.

17. The driver system of claim 9, wherein the alternating shorting frequency is variable during passive braking and the controller is configured to adjust the alternating shorting frequency as the current motor speed changes during passive braking.

18. The driver system of claim 1, wherein the controller is configured to set the alternating shorting frequency to be equal to or greater than a Nyquist frequency of the motor at a time passive braking is initiated.

19. The driver system of claim 18, wherein the alternating shorting frequency is fixed during passive braking.

20. The driver system of claim 1, wherein, for passive braking, the controller is configured to set a predetermined duty ratio such that a thermal load is distributed substantially equally between the first high-side transistor, the first low-side transistor, the second high-side transistor, and the second low-side transistor such that respective junction temperatures of the first high-side transistor, the first low-side transistor, the second high-side transistor, and the second low-side transistor are substantially equal 21. The driver system of claim 2, further comprising:
a third half bridge circuit comprising a third high-side transistor and a third low-side transistor, wherein the third high-side transistor and the third low-side transistor are configured to cooperatively generate a third load current for driving the motor, wherein the third load current has the AC electrical frequency that corresponds to the current motor speed of the motor,
wherein the gate driver circuit is configured to drive the third high-side transistor and the third low-side transistor between switching states to generate the third load current based on the at least one control signal,
wherein the controller is configured to generate the at least one control signal to control the first load current, the second load current, and the third load current,
wherein, during passive braking, the gate driver circuit is configured to drive the third high-side transistor and the third low-side transistor in a complementary manner between their respective switching states at the alternating shorting frequency with the predetermined duty cycle to reduce the current motor speed of the motor,
wherein, during passive braking, the first high-side transistor, the second high-side transistor, and the third high-side transistor are driven synchronously between their respective switching states at the alternating shorting frequency such that they are all on simultaneously or all off simultaneously, and
wherein, during passive braking, the first low-side transistor, the second low-side transistor, and the third low-side transistor are driven synchronously between their respective switching states at the alternating shorting frequency such that they are all on simultaneously or both all simultaneously.

22. A method of passively braking a motor to reduce a current motor speed of the motor, the method comprising;
generating at least one control signal to control a first load current generated by a first half bridge circuit and a second load current generated by a second half bridge circuit,
wherein the first half bridge circuit comprising a first high-side transistor and a first low-side transistor, wherein the first high-side transistor and the first low-side transistor are configured to cooperatively generate the first load current for driving the motor, wherein the first load current has an AC electrical frequency that corresponds to the current motor speed of the motor, and
wherein the second half bridge circuit comprising a second high-side transistor and a second low-side transistor, wherein the second high-side transistor and the second low-side transistor are configured to cooperatively generate the second load current for driving the motor, wherein the second load current has the AC electrical frequency that corresponds to the current motor speed of the motor; and during passive braking, synchronously driving the first high-side transistor and the second high-side transistor between their respective switching states at an alternating shorting frequency such that they are simultaneously in a same switching state, and synchronously driving the first low-side transistor and the second low-side transistor between their respective switching states at the alternating shorting frequency such that they are simultaneously in a same switching state, wherein the first high-side transistor and the second high-side transistor are driven in a complementary manner to the first low-side transistor and the second low-side transistor according to a predetermined duty cycle.

* * * * *